UNITED STATES PATENT OFFICE 2,385,713

AMIDOPHOSPHATES

Gennady M. Kosolapoff, Dayton, Ohio, assignor to Monsanto Chemical Company, St. Louis, Mo., a corporation of Delaware No Drawing. Application February 3, 1944, Serial No. 520,961

3 Claims. (Cl. 260—461)

The present invention relates to esters of amidophosphoric acids and more particularly to esters of amidophosphoric acids with certain substituted phenols.

An object of the present invention is the preparation of new esters of amidophosphoric acids. Another object of the invention is the provision of improved germicides and bactericides.

These and other objects which will be hereinafter disclosed are provided by the following invention wherein there are prepared compounds having the general structure:

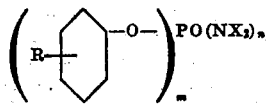

where $m$ and $n$ each represents an integer, the sum of $m$ and $n$ being equal to 3, R is a hydrocarbon radical of from 5 to 7 carbon atoms and X is a member of the group consisting of hydrogen, alkyl and aryl radicals.

As illustrative of compounds having the above general formula may be mentioned p-amylphenyl diamidophosphate, o-phenylphenyl diamidophosphate, p-amylphenyl N-dimethyldiamidophosphate, p-amylphenyl N-ethyldiamidophosphate, p-amylphenyl N-ethyldiamidophosphate, p-amylphenyl N,N'-tetramethyldiamidophosphate, di-(p-amylphenyl) amidophosphate, di(p-amylphenyl) N-diphenylamidophosphate, di(p-amylphenyl) N-isopropylamidophosphate, o-phenylphenyl N-dimethyldiamidophosphate, o-phenylphenyl N,N'-tetramethyldiamidophosphate, bis-(o-phenylphenyl) amidophosphate, bis(o-phenylphenyl) N-diphenylamidophosphate, p-hexylphenyl diamidophosphate, bis(p-hexylphenyl) amidophosphate, p-hexylphenyl N,N'-tetramethyldiamidophosphate, bis(p-hexylphenyl) N-dihexylamidophosphate, p-heptylphenyldiamidophosphate, bis(p-heptylphenyl) amidophosphate, p-heptylphenyl N,N'-tetraethyldiamidophosphate, p-heptylphenyl N-dibutylamidophosphate, bis(p-heptylphenyl) N-tolylamidophosphate, p-phenylphenyl diamidophosphate, p-phenylphenyl N,N'-tetramethyl diamidophosphate, bis(m-phenylphenyl) amidophosphate, bis(o-tolylphenyl) amidophosphate, p-tolylphenyl diamidophosphate, etc.

The amidophosphate esters of the above general formula are prepared by reaction of the correspondingly substituted phenylphosphoryl dihalides or diphenylphosphoryl halides with ammonia or a primary or secondary amine. The reaction for the preparation of esters of diamidophosphoric acid, for example, takes place substantially according to the equation:

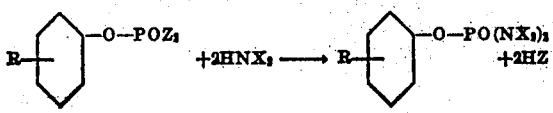

wherein R is an alkyl or aryl radical of from 5 to 7 carbon atoms, Z is halogen, i. e., chlorine, bromine, iodine or fluorine and X is a member of the group consisting of hydrogen, an alkyl radical and an aryl radical. The production of esters of mono-amidophosphoric acid proceeds according to the equation:

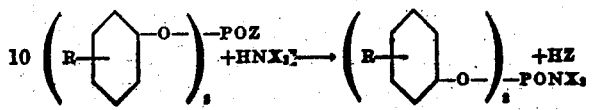

wherein R, Z and X are as defined above.

Preparation of both the mono-amidophosphates and the diamidophosphates is effected advantageously by slowly adding the phosphoryl halide to concentrated ammonium hydroxide or to the desired primary or secondary amine, low temperatures, i. e., temperatures of from —10° C. to 10° C., preferably being employed with ammonium hydroxide or the low-boiling alkyl amines. Reaction may also be effected by passing ammonia or the primary or secondary amine into a solution of the phosphoryl halide in a material which serves as an inert solvent for the same, i. e., benzene and other aromatic hydrocarbon solvents. When preparing the amidophosphates by the latter method, optimum reaction temperatures vary with the nature of the amidating agent employed, though generally the temperatures used for reactions effected in solution are greater than those employed when no solvent is used. Constant and vigorous stirring is maintained when employing either method; however, it is especially necessary when operating in the absence of an added solvent or diluent. When effecting the reaction in absence of a solvent, isolation of the reaction product is generally facilitated in that the amidophosphate is precipitated from the reaction mixture as it is formed. For the final purification of the ester it is then generally sufficient to dissolve it in an organic solvent, for example, alcohol, and to reprecipitate it by adding water to the solution.

A convenient method of operation whereby solutions of higher, N-substituted amidophosphates may be obtained, comprises dissolving the substituted phenylphosphoryl halide and a suitable primary or secondary amine such as aniline or diphenylamine in benzene and thereafter heating the mixture to its refluxing temperature while maintaining vigorous stirring. This results in the preparation of a solution of the higher, N-substituted amidophosphate which may be separated from the solvent and from the excess of either reactant that may be still present in the reaction mixture, by fractional distillation or by precipitation of the desired amidophosphate from water.

The present esters of amidophosphoric acids are for the most part crystalline solids, stable to light and air. They melt without decomposition at relatively high temperatures, i. e., at temperatures of above, say, 130° C. The esters are insoluble in water, but generally soluble in the customary organic solvents. They are hydrolyzed by aqueous solutions of acids, yielding with higher acid concentrations the substituted phenol, phosphoric acid and ammonia or the alkyl amine.

The esters of the present invention are advantageously employed as germicides and bactericides. While some prior materials which have been used for this purpose have been generally disadvantageous because of their corrosive properties and their toxicity to humans, the present amido esters display great germicidal and bactericidal action and at the same time are relatively non-corrosive. For use as bactericides or germicides the amidophosphates may be dissolved in an organic solvent, for example, alcohol and used in solution, or they may be ground into powder and employed as such either alone or admixed with inert materials such as talc, zinc oxide, etc.

A further application to which the amidophosphates of the substituted phenols may be directed consists of their incorporation as toxicants into parasiticidal, fungicidal and insecticidal compositions. Solutions or aqueous suspensions of the esters may be employed as sprays and applied to leaf foliage, trunks and branches of trees, etc., the amidophosphates serving not only as an active toxicant against insect pests but also as a protective agent against the formation of spore-forming fungi. When used in dusting compositions, the esters may be compounded with diverse inert carriers such as bentonite, talc, wood flour, etc. Sprays and dusting compositions comprising the present amidophosphates may also be incorporated with various wetting, dispersing and sticking agents.

Since the amidophosphates are stable, neutral materials they may be admixed with other insecticidal and bactericidal compositions, for example, with rotenone, organic thiocyanates, sulfur, etc., without decomposition.

The present amidophosphates are also advantageously employed as plasticizing agents for synthetic resinous materials. They impart a high degree of plasticity to such synthetic resins as the polyvinyl resins in general and do not volatilize or crystallize therefrom when plastic products into which they have been incorporated are exposed to variations in temperature, long standing, etc.

A particularly important application of those of the present phosphamides which contain as the N-substituent a long chain alkyl group is in the textile industry, wherein these particular phosphamides find use as surface-active agents, i. e., as wetting agents or detergents, softening agents, textile lubricants, etc., the specific field of application being determined by the nature of the alkyl substituent.

The N-aryl substituted phosphamides, as well as those in which the N-hydrogen is unsubstituted are useful as corrosion inhibitors for motor fuels. The N-alkyl substituted phosphamides in general impart extreme pressure resisting properties to lubricants when incorporated therein.

The invention is further illustrated, but not limited, by the following examples:

Example 1

*p - Tert - amylphenyl diamidophosphate.*—75 grams of p-tert-amylphenylphosphoryl dichloride was added, dropwise, into 400 ml. of concentrated ammonium hydroxide. The reaction vessel was kept in an ice-bath during the addition and the reaction mixture was constantly stirred. The precipitate which formed was filtered off, dissolved in alcohol, and reprecipitated by diluting the alcohol solution of water. Upon filtering and drying the reprecipitated material there was obtained 52 grams (80.5% theoretical yield) of substantially pure p-tert-amylphenyl diamidophosphate, M. P. 160° C.

p-Tert-amylphenyl diamidophosphate is substantially insoluble in water and soluble in the usual organic solvents. It is stable under ordinary atmospheric conditions and does not decompose at its melting point.

Example 2

*o-Phenylphenyl diamidophosphate.*—This compound was prepared by following the procedure described in Example 1, except that instead of using p-tert-amylphenylphosphoryl dichloride, there was employed 109 grams of o-phenylphenylphosphoryl dichloride. There was thus obtained 58 grams (61.5% yield) of o-phenylphenyl diamidophosphate, M. P. 151° C.

The amidophosphate of this example has the solubility properties of the amidophosphate of Example 1. It is a stable, neutral, crystalline solid which may be ground into a highly effective bactericidal dusting powder or used in solution or oil emulsion as germicide or antiseptic.

When employing bis(p-tert-amylphenyl) phosphoryl chloride or bis(o-phenylphenyl) phosphoryl chloride instead of the dichlorides of Examples 1 and 2 and operating substantially as described in those examples but using, say, amounts of ammonium hydroxide equivalent to slightly more than one-half of that employed in the previous examples, there are obtained good yields of bis(p-tert-amylphenyl) amidophosphate and bis(o-phenylphenyl) amidophosphate, respectively.

Preparation of the N-alkyl or N-aryl substituted mono- or bis-p-tert-amylphenyl amidophosphates may be similarly effected, except that instead of employing ammonium hydroxide as the amidating agent there is employed a primary or secondary amine, and the reaction is effected at from moderate to high temperatures, say, from 10° C. to 100° C., depending upon the nature of the amine employed, if the amine employed is not one of the lower-boiling alkyl amines, for example, methylamine, dimethylamine, ethylamine, etc. With the lower-boiling alkyl amines the low temperatures employed in Examples 1 and 2 may be used.

Other modes of applying the principle of this invention may be employed instead of those explained, change with respect to reaction conditions and materials employed provided it is within the scope of the following claims.

I claim:

1. Compounds having the general formula:

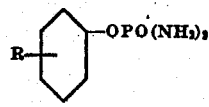

wherein R is a hydrocarbon radical of from 5 to 7 carbon atoms.
2. p-Tert-amylphenyl diamidophosphate.
3. o-Phenylphenyl diamidophosphate.

GENNADY M. KOSOLAPOFF.